United States Patent [19]

Ellis

[11] 3,718,767

[45] Feb. 27, 1973

[54] MULTIPLEX OUT-OF-BAND SIGNALING SYSTEM

[75] Inventor: Lynn W. Ellis, Westport, Conn.

[73] Assignee: International Telephone and Telegraph Corporation, Nutley, N.J.

[22] Filed: May 20, 1971

[21] Appl. No.: 145,138

[52] U.S. Cl...........179/15 BM, 179/15 BY, 178/66 R

[51] Int. Cl...................................................H04j 3/12

[58] Field of Search...........179/15 A, 15 BM, 15 BY; 178/66 R

[56] References Cited

UNITED STATES PATENTS

| | | | |
|---|---|---|---|
| 2,485,886 | 10/1949 | Johnstone | 179/15 BM |
| 3,261,922 | 7/1966 | Edson | 179/15 BM |

*Primary Examiner*—Ralph D. Blakeslee

*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A multiplex out-of-band signaling system for a communication system having one or more frequency channels is disclosed. N signaling data gate N gated amplifiers coupled in common to a signaling tone having a frequency disposed outside the frequency channel or channels such that a different predetermined amplitude of the signaling tone is provided for each of the N signaling data according to a given amplitude code. These different amplitudes of the signaling tone are combined as a composite multi-level signal for transmission. At the receiver the composite signal is recovered and the levels therein are detected in a level decision circuit in accordance with the given amplitude code so that the N signaling data are separated and reproduced for utilization.

9 Claims, 5 Drawing Figures

INVENTOR
LYNN W. ELLIS
BY Alfred C. Hill
AGENT

INVENTOR
LYNN W. ELLIS

BY

Alfred C. Hill
AGENT

MULTIPLEX OUT-OF-BAND SIGNALING SYSTEM

BACKGROUND OF THE INVENTION

This invention relates to a communication system having one or more frequency channels and more particularly to a multiplex out-of-band signaling system for such communication systems.

Out-of-band signaling is used in a single frequency channel system or a frequency division multiplex (FDM) system for the purpose of supervisory and control purposes. The out-of-band signaling is accomplished by employing a signaling tone which has a frequency disposed outside the frequency channel or channels and is used to convey supervisory and/or control data by appropriate multiplexing with the frequency channel or channels.

A first conventional out-of-band signaling system employs a signaling tone at eight 3825 or 3850 hertz (Hz) and is keyed "on" or "off" by signaling data originating in a relay set or equivalent. This is multiplex with the speech information (typically 300–3400 Hz for a single frequency channel) and the resultant multiplexed signal is heterodyned with a carrier signal to the appropriate frequency range for the type of multiplex in which it is employed. On the receive side, the signaling tone is separated from the speech at some convenient point, filtered to avoid interference from speech signal, amplified, detected and in reconstituted form as a "on"-"off" signal applied usually to a relay set or equivalent to recover the signaling data. Such a system provides the transmission of "on"-"off" type information. As more numerous signaling data are usually required, the relay set performs the function of sending long and short impulses or quantities of impulses (each impulse being one "on" followed by one "off" transition) to express the appropriate signaling condition.

One of the disadvantages to this first conventional out-of-band signaling system is that only two state signaling ("on" or "off") is permitted. It has been determined that a considerable economic saving per channel end (in the relay sets) would be accomplished if a method were found to provide an indication of four states of signaling rather than the normal two states of signaling. A straight forward engineering solution to provide the four state signaling would be to place an additional keyer and transmit signaling filter on the transmit side and an addition pick off filter, amplifier and detector on the receive side to accomplish the desired four state signaling. Such a solution has been investigated employing a 3700 Hz signaling frequency. However, one of the short coming of this solution is that the 3700 Hz filter on the sending side must protect against speech interference 300 Hz away whereas the 3825 Hz normal frequency has 425 Hz to the edge of the useable band. Thus, the signaling filter is more complex and expensive at both the transmitter and receiver to avoid inter signaling channel interference and to avoid interference with the speech channel or channels. In addition, the speech low-pass filter on the send side must now suppress a signaling channel 300 Hz away from the edge of the useable band instead of 425 Hz away. Not only will this speech filter be more expensive, but its group delay distortion will increase making the speech channel less suitable for data transmission. The same situation occurs on the receive side.

A second solution to the problem of providing four state signaling by providing a second signaling tone involves a second frequency higher than 3825 Hz rather than lower to avoid the above mentioned shortcoming finds the following other conflicts. First, a frequency of 3920 Hz must be protected since this is the equivalent frequency into which the group and super-group reference pilot frequencies fall after translation. Second, the frequency 4kHz (kilohertz) represents the equivalent frequency of the carrier of the next channel higher in allocation and must be protected to avoid carrier beat. Third, the information band of the next higher channel begins at 4300 Hz so that a frequency above 4kHz would create problems relative to the speech low-pass filter on both the send and receive sides of the system.

A second conventional out-of-band signaling system employs two signaling tones at 3.7kHz and 3.9 kHz. On the send side a frequency shift arrangement is usually used and on the receiving side a frequency discriminator is used in lieu of an amplitude detector. When used to signal on a two state basis, the combined detection of both tones is used as an automatic gain control feature. If the time constant of the automatic gain control circuit is long, momentary interruption of both tones and momentary sending of both tones can be used as two additional signaling states. This second conventional system would have disadvantages analogous to the disadvantages of the first conventional system outlined hereinabove. In addition, the use of two frequencies which could be on simultaneously increases the loading of common amplifiers in the multiplex system at an attendant disadvantage of higher intermodulation or alternatively higher harmonic margin requirements on the same amplifier to maintain the present intermodulation levels.

A third technique not yet applied to FDM provides out-of-band signaling in a separate common channel. In one of its forms this common channel is subdivided into channel associated signaling elements by time division multiplex. Sufficient bits are available in the bit stream (64 kilobits per second (kbs)) to provide four or more signaling states for each of 30 channels. A disadvantage of this common channel signaling technique when applied to conventional FDM is that it would take a speech channel out of service. Since the maximum working data transmission rate on FDM speech channels is at present 9.6 kbs as against a 64 kbs in pulse code modulation systems, a lower ratio of working to signaling speech channels would be obtained in FDM than the 30 to 1 ratio of working to signaling speech channels in pulse code modulation for the same number of states of signaling per working speech channel.

SUMMARY OF THE INVENTION

An object of the present invention is to provide an improved multiplex out-of-band signaling system which overcomes the disadvantages of the three prior art arrangements mentioned hereinabove.

In accordance with the principles of the present invention, there is provided multi-level or amplitude coding of the signaling channel, or alternatively a common multi-level coding for the signaling channel present in the space between speech channels in a FDM system.

Another object of the present invention is to provide four or more signaling states in an economical manner when compared to the first and second conventional prior art techniques mentioned hereinabove without introducing more stringent filtering requirements in the speech channels which would worsen the delay distortion. The technique of the present invention is more economical since the multi-level encoder and decoder can be an all-solid-state arrangement rather than the more costly filtering arrangement necessarily employed in the first and second conventional prior art techniques.

Still another object of the present invention is the provision of a four or more signaling system that has the advantage over the third prior art technique without the necessity of utilizing one of the working speech channels and thus remove this channel for transmission of speech.

A feature of the present invention is the provision of a multiplex out-of-band signaling system for a communication system having M frequency channels, where M is an integer equal to one or more comprising a first source of signaling tone having a predetermined frequency disposed outside said channels; N sources of signaling data, where N is an integer greater than one; first means coupled to the first source and the N sources to modulate the signaling tone with each of the signaling data; and second means coupled to the first means responsive to the modulated signaling tone to recover each of the signaling data for utilization.

BRIEF DESCRIPTION OF THE DRAWING

Above-mentioned and other features and objects of this invention will become more apparent by reference to the following description taken in conjunction with the accompanying drawing, in which.

Description of the Preferred Embodiment

Figure 1:
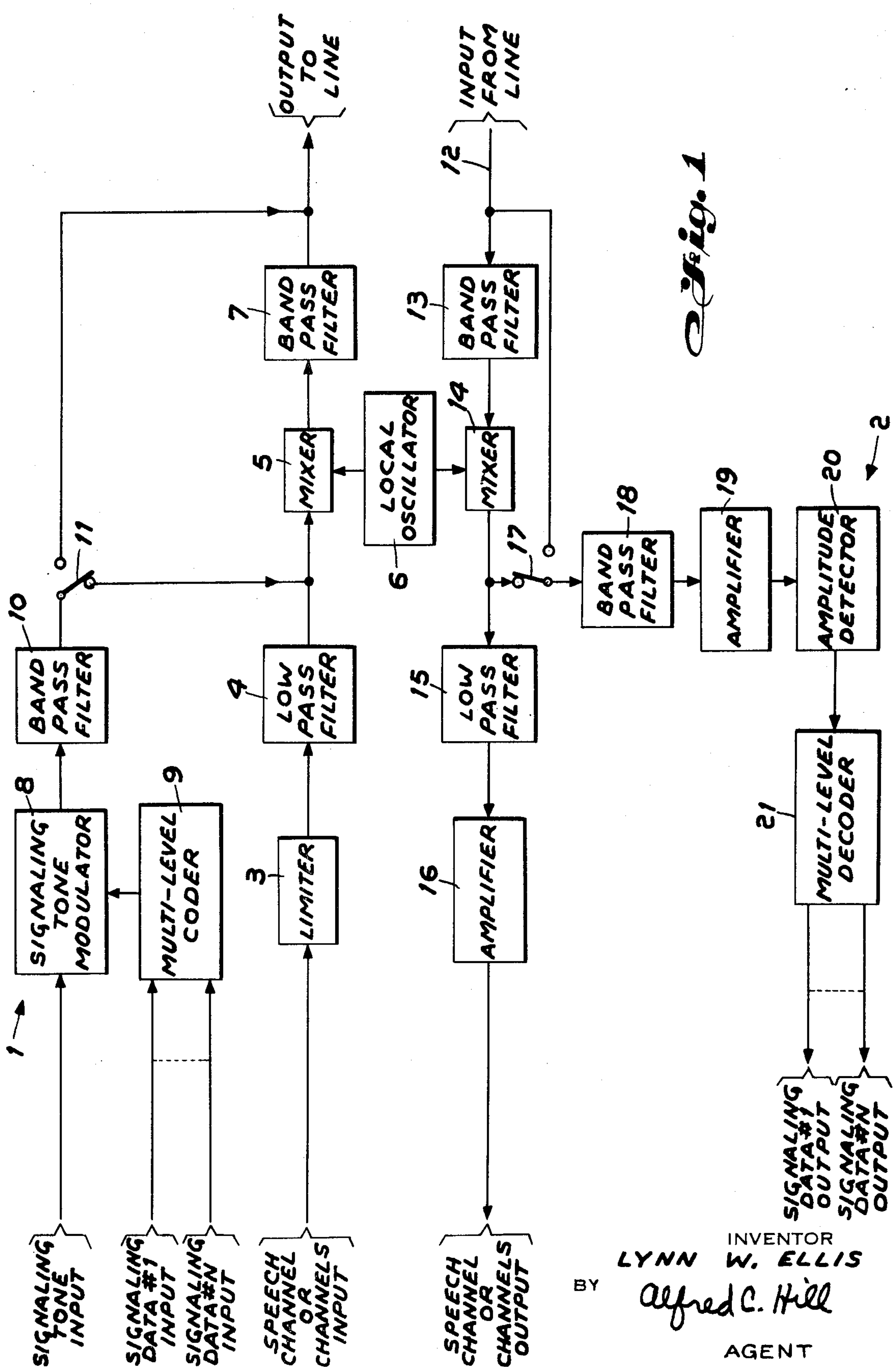
FIG. 1 is a general block diagram illustrating one embodiment of the multiplex out-of-band signaling system in association with a communication system with one or more frequency channels in accordance with the principles of the present invention.

Referring to FIG. 1, there is disclosed therein a general block diagram of the components employed in a single frequency channel or FDM communication system incorporating a multiplex out-of-band signaling system in accordance with the principles of the present invention. It will be observed that FIG. 1 is laid out as a single terminal of a communication system having locate therein for two way communication both the transmit portion 1 and receive portion 2. It is to be noted, however, that in a two way system portions 1 and 2 would be included in a remote terminal station such that portion 2 would be connected by transmission line to the output of portion 1 of the local terminal station illustrated. Thus, the equipment of Portion 2 is a distant terminal station would receive and detect the output signal from portion 1 of the illustrated local terminal station. Likewise equipment similar to portion 1 at the remote terminal station would provide an input to the illustrated portion 2 of the local terminal station.

The speech channel or channels would be applied to amplitude limiter 3 and then to the transmit low pass filter 4 prior to coupling to mixer 5 which under control of the output of local oscillator 6 will hetrodyne or translate the baseband frequency channel or channels to the proper frequency region for transmission through band pass filter 7 and the transmission line for communication to the remote terminal station. This is a conventional frequency channel or FDM speech communication system.

The out-of-band signaling system in accordance with the principles of the present invention incorporates a signaling tone modulator 8 to which is applied a signaling tone having a frequency disposed outside the channel or channels of the communication system. Signaling data from N different sources are applied to multi-level coder 9. The N signaling data are of the "on"-"off" type signals and will modulate the amplitude of the signaling tone in the modulator 8 according to a given amplitude code so as to convey the data of each of the signaling data in a multi-level composite signal that will be present at the output of modulator 8. The output of modulator 8 is passed through band pass filter 10 and through switch 11 in the position illustrated to the input of mixer 5. With switch 11 in the position illustrated the signaling tone would have a frequency of proper selected value so that when it is translated along with the baseband frequency channel or channels in mixer 5 the tone will have the proper frequency value outside the channel or channels of the communication system such that it will not interfere with or cause cross-talk into the speech channel or channels and will not interfere with the reference pilot signals. Alternatively, switch 11 could be moved to make connection to its other contact. In this alternative and in this arrangement the signaling tone would be originally selected to be in proper position with respect to the translated frequency channel or channels so as not to interfere with the channels themselves or the reference pilot frequencies.

The audio channel or channels, the reference pilot signals and the composite multi-level signaling signal will be transmitted at the output of band pass filter 7 to the transmission line for propogation to a distant terminal station. This signal at the remote station, or a similar signal transmitted from the distant terminal, will be received from the transmission line and applied to conductor 12 for coupling band pass filter 13. The output of filter 13 is coupled to mixer 14 which together with the carrier output of oscillator 6 will heterodyne the pilot signals, the frequency channel or channels and the composite signaling signal to the proper baseband level for application to the receive low pass filter 15 and signaling channel band pass filter 18 with switch 17 in the position illustrated. Filter 15 will pass only the baseband frequency channel or channels and the reference pilot signals for application to amplifier 16 and hence, to a utilization device (not shown). With switch 17 in the position illustrated, band pass filter 18 will pass the composite multi-level signaling signal and reject the speech channel or channels and their associated pilot frequencies. The output of filter 18 is coupled to amplifier 19 and then to an amplitude detector 20 which will detect the various levels of the composite signaling signals for application to the multi-level decoder 21. Decoder 21 responds to the various levels to separate these levels according to the given amplitude code employed and then recover each of the N signaling data for further utilization in devices not illustrated.

To be compatible with the transmit portion 1 with switch 11 in the position other than the one illustrated, switch 17 of the receive portion 2 is moved to its other position so that the signaling tone having the appropriate value with respect to the translated speech channel or channels is coupled directly to band pass filter 18 from conductor 12 with band pass filter 18 being designed to receive the signaling tone at this higher frequency value without requiring translation thereof to the usual baseband level.

Figure 2:
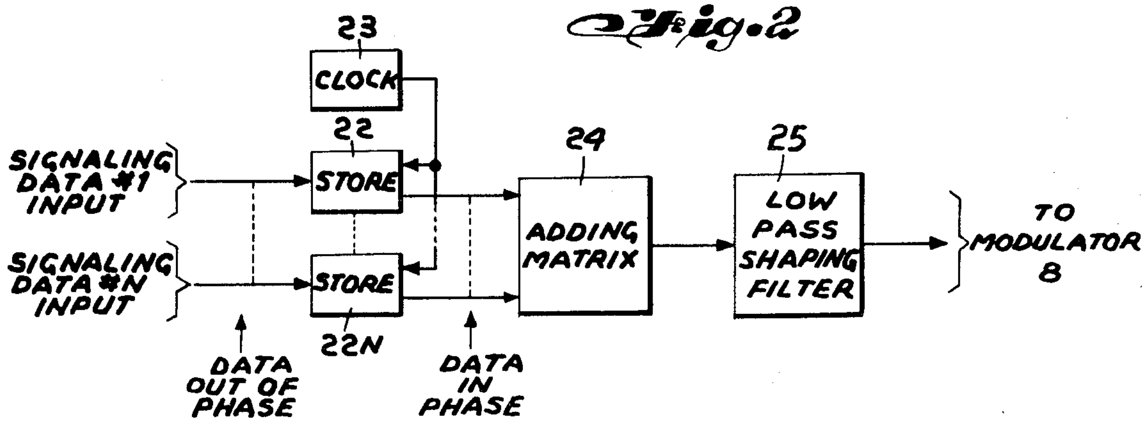
FIG. 2 is a general block diagram of the multi-level coder of FIG. 1.

Referring to FIG. 2, there is illustrated a general block diagram of multi-level coder 9 of FIG. 1. The multi-level coder 9 would in general include N signaling data input which are asynchronous. The N signaling data are coupled to associated stores 22 which under control of clock 23 will place the N signaling data in synchronism for application to adding matrix 24 such that at the output of matrix 24 there is provided composite multi-level signal in accordance with a given amplitude code to enable the separation and recovering of the N signaling data in the multi-level decoder 21 of FIG. 1. Matrix 24 is coupled to a low pass shaping filter 25 prior to application to modulator 8. Filter 25 is required to perform the dual function of achieving maximum energy in the desired frequency spectra and minimum energy in any band more than 300Hz away from the signaling frequency so as to avoid interference in adjacent speech channels. The output of shaping filter 25 would then be employed in modulator 8 of FIG. 1 to modulate the signaling tone which is appropriately multiplexed, as discussed with respect to FIG. 1, with the speech channel or channels for propogation along the output transmission line.

Figure 3:
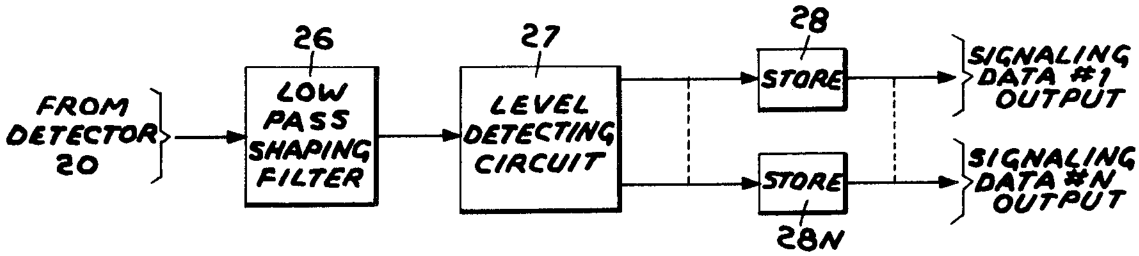
FIG. 3 is a general block diagram of the multi-level decoder of FIG. 1.

Referring to FIG. 3, there is disclosed a general block diagram of the multi-level decoder 21 of FIG. 1. The output from amplitude detector 20 is coupled to a low-pass shaping filter 26 to aid in achieving the proper signal distribution and reject any interference from adjacent speech channels which may appear despite the channel band pass filters. The output of filter 26 is coupled to level detecting circuit 27 which decides the level that has been received, produces the corresponding signaling condition and applies this signaling condition to the appropriate one of the N signaling data outputs of detecting circuit 27. The N signaling data are applied to associated stores 28 which will hold the signaling condition last received for its associated signaling data or can otherwise be manipulated to interrupt the operation of the system in the event of signaling tone failure. The output of the stores 28 are coupled to associated utilization device (not shown).

With the system thus far described, it would be possible to employ this equipment in an FDM system wherein each audio channel has a bandwidth of 4kHz with 3.1 kHz being used for speech and 900Hz being used for a guard band between channels, the insertion of signaling data and the insertion of reference pilot signals. It has been traditional to employ the frequency of 3825 Hz for signaling which is 425Hz from one speech channel limit and 475 Hz from the next speech channel limit. The baseband frequency 3920Hz represents the normal pilot frequency location into which 84.080, 104.080 or 411.920 kHz pilots will fall when appropriately translated in frequency. This frequency of 3920 Hz is 520 Hz from one speech channel and 380 Hz from the next speech channel. In fact, the band from 3825 to 3920 Hz at a level of minus 20 dbm0 (decibels referred to a point of zero relative level) is relatively free from interference both from and into the voice channel. Such a 95Hz band, given a sufficient signal to noise ratio is capable of carrying far more information than a single ten impulse per second signaling signal. In accordance with the present invention where multi-state signaling is associated with each channel the signaling frequency of the signaling tone would be set near 3825 Hz and a narrower band used to avoid pilot interference. Where the present invention is employed where a common signaling channel is used for a 12 channel group one signaling tone would be chosen having a frequency near the center of the group but not adjacent to a speech channel where the translated pilot frequencies 84.080, 104.080 or 411,920 kHz would fall so as to avoid pilot interference. Thus, it would be possible to use the full 95 Hz band previously mentioned and perhaps a band as high as 120 Hz (for instance, 3810–3930 Hz). According to Nyquist's principle a signaling rate could reach two bits per Hz without coding, although practical considerations would limit this to about one bit per Hz or less. However, with the multi-level coding technique of the present invention, it would be possible to reach three bits per Hz ( for instance, 9600 bits per second in a 3100 Hz band).

Figure 4:
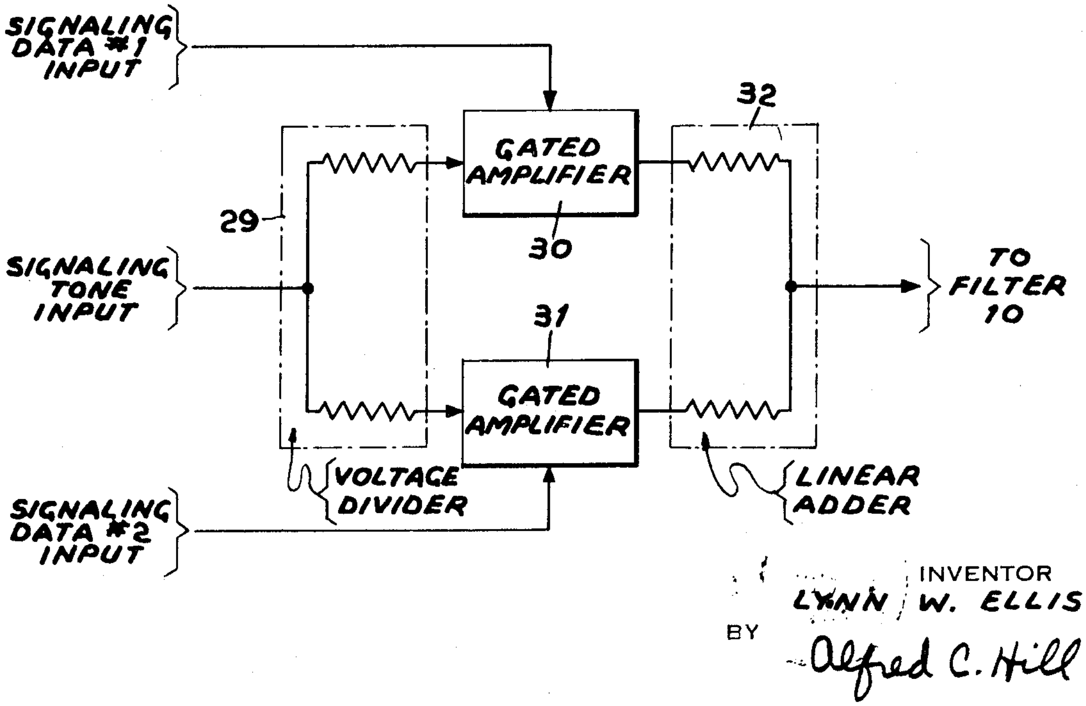
FIG. 4 is a schematic diagram partially in block form of an embodiment of the multi-level coder and signaling tone modulator of FIG. 1 to be employed with two sources of signaling data.

Having previously discussed the general technique and components of the present invention in terms of N signaling data each of which provides a different amplitude of the signaling tone when it its "on" condition, the discussion of FIGS. 4 and 5 hereinbelow will be directed to a multiplex out-of-band signaling system in accordance with the present invention employing two signaling data sources or channels in which the given amplitude code is as shown in the following TABLE.

TABLE

| Level | Relative Voltage | Signaling Data No. 1 Condition | Signaling Data No. 2 Condition |
|---|---|---|---|
| 1 | 0 | OFF | OFF |
| 2 | ⅓ | OFF | ON |
| 3 | ⅔ | ON | OFF |
| 4 | 1 | ON | ON |

It should be kept in mind that the above amplitude code is only for purposes of explanation and it would be obvious to those skilled in the art to modify this amplitude code where the signaling data channels are greater than two. The primary principle of the code is to enable the receive portion of the system to separate from the resultant multi-level composite signal the conditions of the various signaling data according to a level in the composite signal and use these separated levels to operate a relay or similar arrangement to reproduce separately each of the signaling data.

Let us assume for purposes of this example that the signaling tone is 3825 Hz and that the column label "Relative Voltage" in the above table has reference to that fraction of the maximum amplitude of the signaling tone. FIG. 4 illustrates a combined multi-level coder and signaling tone modulator which produces the composite multi-level signaling signal for application to filter 10 of FIG. 1. The signaling tone is coupled through a voltage divided 29 to a pair of gated amplifiers 30 and 31. Amplifier 30 is gated by the "on"-" off" signaling data No. 1. Gated amplifier 30 has its gain adjusted to provide at its output when gated by the "on" condition of signaling data No. 1 the signaling tone having two-thirds its maximum amplitude. In other words, when signaling data No. 1 has an "on" condition amplifier 30 provides level No. 3 according to the above amplitude code at its output for application to linear adder 32. Gated amplifier 31 is gated by signaling data No. 2 with the gain of amplifier 31 being adjusted so as to provide at its output an amplitude of the signaling tone equal to one-third its maximum amplitude or level No. 2 according to the above amplitude code. Thus, the resultant multi-level composite signal will be zero or level No. 1 when both signaling data No. 1 and signaling data No. 2 are in its "off" condition. Level number 2 of the composite signal will be present when data No. 1 is in its "off" condition and data No. 2 is in its "on" condition. Level No. 3 of the composite signaling signal will correspond to data No. 1 being in an "on" condition and data No. 2 being in an "off" condition. Level number 4 of the composite signal at the out of linear added 32, due to the operation of linear added 32, will have maximum signaling tone amplitude and will correspond to both data No. 1 and data No. 2 simultaneously having an "on" condition.

Figure 5:
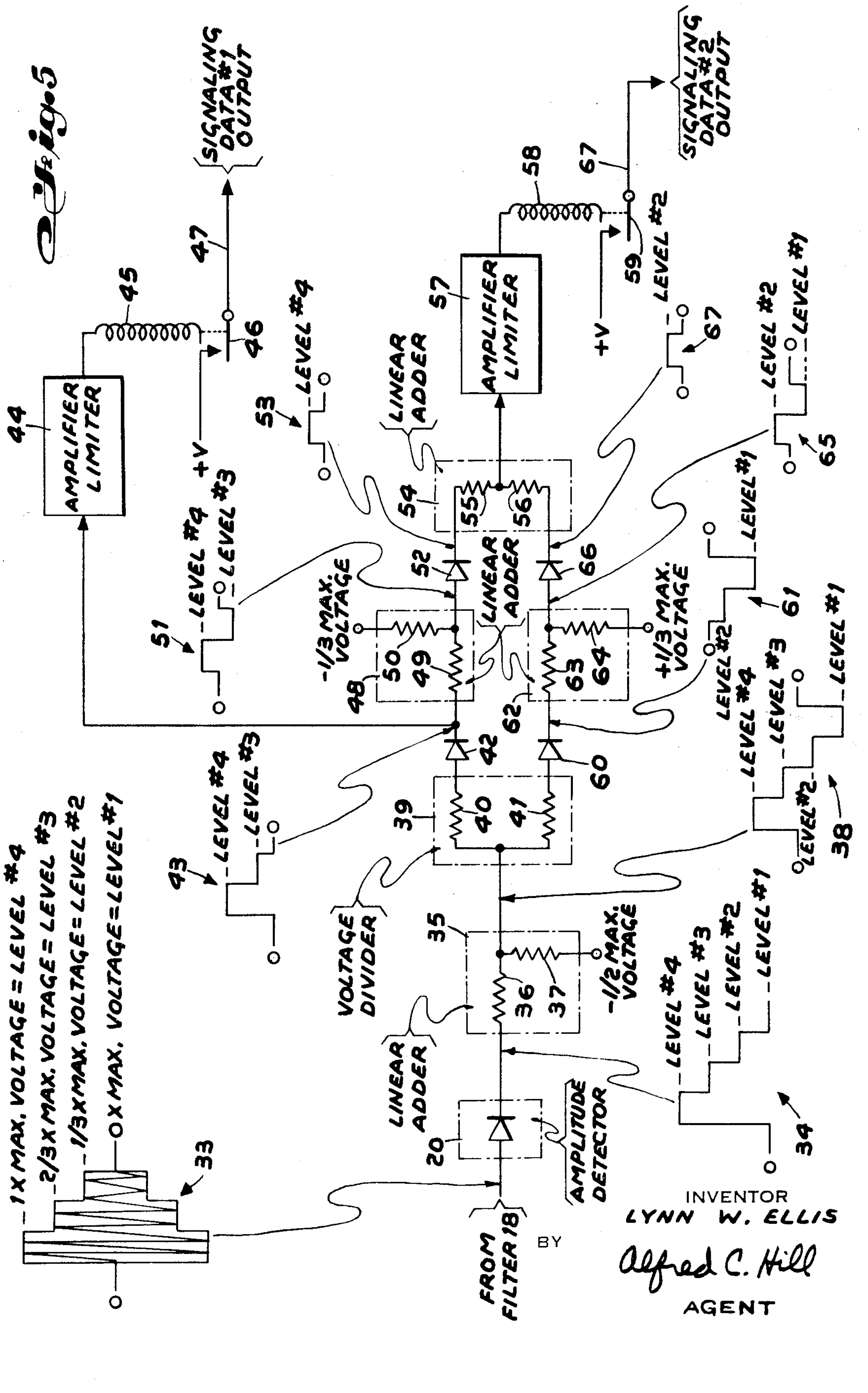
FIG. 5 is a schematic diagram partially in block form of the level detecting circuit of FIG. 3 to cooperate with the multi-level coder and signaling tone modulator of FIG. 4.

Referring to FIG. 5, there is illustrated therein one embodiment of the level detecting circuit 27 of FIG. 3 together with the amplitude detector 20 of FIG. 1. The signal at the output of filter 18 (FIG. 1) is the composite multi-level signaling signal as illustrated in waveform 33 at the input of amplitude detector 20. Detector 20 is illustrated as being a properly poled diode which acts to recover the envelope and, thus, the signal levels from waveform 33 as illustrated in waveform 34. The output of detector 20 is applied to a linear adder 35 which includes a pair of resistors 36 and 37 having a common output. The other terminal of resistor 36 is coupled to the output of detector 20 and the other terminal resistor of terminal 37 is coupled to a source of voltage equal to −½ the maximum voltage of the signaling tone. The linear addition that takes place in added 35 results in waveform 38 wherein levels No. 1 and No. 2 are negative with respect to the reference or zero level and reference levels No. 3 and No. 4 are positive with respect to the reference or zero level. This waveform is coupled to voltage divider 39 formed by resistors 40 and 41. The output of resistor 40 is coupled to diode 42 poled to pass only the positive portion of waveform 38 as shown in waveform 43. Waveform 43 is coupled to amplifier limiter 44 and, then, to relay coil 45. During the presence of either or both of level No. 3 and level No. 4 the "on" condition of signaling data No. 1 is recovered by activating relay 45 and causing contact 46 to apply a +V voltage to the signaling data No. 1 output line 47. The absence of reference No. 3 and/or level No. 4 represents, in accordance with the above amplitude code, the "off" condition of signaling data No. 1. Thus, the levels representing the signaling condition of signaling data No. 1 are separated from the composite signaling waveform and the information of signaling data No. 1 is recovered.

Signaling data number 2 is recovered from the composite waveform by employing the following equipment. The output of diode 42 (waveform 43) is applied to linear added 48 including resistor 49 coupled to the output of diode 42 and resistor 50 coupled to a voltage source having a magnitude equal to −⅙ of the maximum voltage of the signaling tone. The addition that takes place in adder 48 results in waveform 51 wherein level No. 4 is positive with respect to the reference level and level No. 3 is negative with respect to the reference level. Waveform 51 is coupled to diode 52 which is poled to pass only level No. 4 as illustrated in waveform 53 to linear adder 54 including resistors 55 and 56. Level No. 4 corresponds to the simultaneous presence of an "on" condition for both signaling data No. 1 and signaling data No. 2 and will be applied through linear added 54 to amplifier limiter 57 for energizing relay coil 58 to move its associated contact 59 into contact with a voltage source +V which will reproduce the "on" condition of signaling data No. 1 on output conductor 67.

It is still necessary to be able to recover level No. 2 of the composite waveform which corresponds to the "on" condition of signaling data No. 2 only at the transmitter. This is accomplished by coupling waveform 38 on resistor 41 of voltage divider 39 to diode 60 which is poled to pass only level No. 1 and level No. 2 of the waveform 38 as illustrated in waveform 61. Waveform 61 is applied to linear added 62 comprising resistors 63 and 64. Resistor 63 is coupled to the output of diode 60 and resistor 64 is coupled to a voltage source which has a value of voltage equal to +⅙ of the maximum amplitude of the voltage of the signaling tone. The addition that takes place in adder 62 produces a waveform as illustrated by waveform 65 wherein level No. 2 is positive with respect to the reference level and level No. 1 is negative with respect to the reference level. Waveform 65 is coupled to diode 66 which is poled to pass only the positive portion of waveform 65, namely, level No. 2 as shown in waveform 67. The voltage equivalent to level No. 2 is coupled through linear adder 54 and then to amplifier limiter 57 for activating relay coil 58 to cause contact 59 to again close the circuit to the voltage source +V which will cause reproduction of the "on" condition for signaling data No. 2 when only signaling data No. 2 is being transmitted from the transmitter.

While I have described above the principles of my invention in connection with specific apparatus it is to be clearly understood that this description is made only by way of example and not as a limitation to the scope of my invention as set forth in the objects thereof and in the accompanying claims.

I claim:

1. A multiplex out-of-band signaling system for a communication system having M frequency channels, where M is an integer equal to one or more comprising:

a first source of signaling tone having a predetermined frequency disposed outside said channels;

N sources of signaling data, where N is an integer greater than one;

first means coupled to said first source and said N sources to simultaneously modulate the amplitude of said signaling tone with each of said signaling data according to a given amplitude code; and second means coupled to said first means responsive to said amplitude modulated signaling tone to recover each of said signaling data for utilization according to said given amplitude code.

2. A signaling system according to claim 1, wherein each of said signaling data is of the "on"-"off" type; and said first means includes third means to provide a different predetermined amplitude of said signaling tone during the "on" condition of each of said signaling data and zero amplitude of said signaling tone during the "off" condition of each of said signaling data.

3. A signaling system according to claim 2, wherein said first means further includes fourth means to combine each of said different predetermined amplitudes of said signaling tone into a composite multi-level signal.

4. A signaling system according to claim 1, wherein each of said signaling data is of the "on"-"off" type; and said first means includes third means to provide a different predetermined fraction of the maximum amplitude of said signaling tone during the "on" condition of each of said signaling data and zero amplitude of said signaling tone during the "off" condition of each of said signaling data, and fourth means to linearly combine each of said different predetermined fractions of the maximum amplitude of said signaling tone to form a composite multi-level signal, said different predetermined fractions being determined according to said given amplitude code that will enable said second means to separate and recover each of said signaling data from said multi-level signal.

5. A signaling system according to claim 4, wherein said third means includes

N gated amplifier each coupled in common to said first source, and to a different one of said N sources, each of gated amplifier being gated by its associated one of each of said signaling data and having its gain adjusted to provide its associated one of each of said different fractions of the maximum amplitude of said signaling tone; and said fourth means includes N resistors each having one end coupled to the output of a different one of said gated amplifier and the other end coupled to a common output terminal for said composite multi-level signal.

6. A signaling system according to claim 4, wherein said means includes fifth means responsive to said multi-level signal to separate and recover each of said signaling data from said multi-level signal according to said given amplitude code.

7. A signaling system according to claim 6, wherein said fifth means includes a level detecting circuit to separate levels from said multi-level signal assigned to each of said signaling data according to said given amplitude code, and relay means responsive to said separated levels of each of said signaling data to recover each of said signaling data.

8. A signaling system according to claim 1, wherein N is equal to 2;

each of said signaling data is of the "on"-"off" type; and said first means includes a first gated amplifier coupled to said first source and one of said sources of signaling data, the gain of said first amplifier being adjusted to provide at its output two-thirds of the maximum amplitude of said signaling tone when gated into conduction by the "on" condition of said signaling data from said one of said sources of signaling data, a first resistor coupled between the output of said first amplifier and a common output terminal, a second gated amplifier coupled to said first source and the other of said sources of signaling data, the gain of said second amplifier being adjusted to provide at its output one-third of the maximum amplitude of said signaling tone when gated into conduction by the "on" condition of said signaling data from said other of said sources of signaling data, and a second resistor coupled between the output of said second amplifier and said common output terminal, said first and second resistors linearly combining said two-thirds and said one-third of the maximum amplitude of said signaling tone to provide at said common output terminal a composite multi-level signal having a first level equal to zero of the maximum amplitude of said signaling tone, a second level equal to one-third of the maximum amplitude of said signaling tone, a third level equal to two-thirds of the maximum amplitude of said signaling tone and a fourth level equal to the maximum amplitude of said signaling tone.

9. A signaling system according to claim 8, wherein said second means includes a detector to recover said composite signal with said first, second, third and fourth levels being positive with respect to a reference voltage, a first source of voltage equal to minus one-half the maximum amplitude of said signaling tone, a first linear adder coupled to said detector and said first source of voltage to provide said composite signal with said first and second levels being negative with respect to said reference voltage and said third and fourth levels being positive with respect to said reference voltage, a voltage divider having an input coupled to the output of said first adder and two outputs, a first diode coupled to one of said two outputs of said voltage divider poled to pass said third and fourth levels at the output of said first adder, a first relay means coupled to the output of said first diode to recover said one of said signaling data, the presence of either of said third and fourth levels causing the reproduction of the "on" condition of said one of said signaling data and the absence of both said third and fourth levels causing reproduction of the "off" condition of said one of said signaling data, a second source of voltage equal to minus one-third the maximum amplitude of said signaling tone, a second linear adder coupled to the output of said first diode and said second source of voltage to provide from said third and fourth levels at the output of said first diode said fourth level positive with respect to said reference voltage and said third level negative with respect to said reference voltage, a second diode coupled to the output of said second adder poled to pass said fourth level at the output of said adder, a third diode coupled to the other of said two outputs of said voltage divider poled to pass said first and second levels at the output of said first adder, a third source of voltage equal to plus one-third the maximum amplitude of said signaling tone, a third linear adder coupled to the output of said third diode and said third source of voltage to provide from said first and second levels at the output of said third diode said second level positive with respect to said reference voltage and said first level negative with respect to said reference voltage, a four diode coupled to the output of said third adder poled to pass said second level at the output of said third adder, a second relay means coupled to the output of said second diode and the output of said fourth diode to recover said other of said signaling data, the presence of either of said second and fourth levels causing the reproduction of the "on" condition of said other of said signaling data and the absence of both said second and fourth levels causing reproduction of the "off" condition of said other of said signaling data.

* * * * *